US006366786B1

(12) United States Patent
Norman et al.

(10) Patent No.: US 6,366,786 B1
(45) Date of Patent: Apr. 2, 2002

(54) RADIO WITH SYNCHRONIZATION APPARATUS AND METHOD THEREFORE

(75) Inventors: Oded Norman, Pardessiya; Moshe Refaeli, Tel Aviv; Boaz Perlman, Peduel; Yoram Salant, Rosh-Haain, all of (IL); Paul McAlinden, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/263,545

(22) Filed: Mar. 8, 1999

(30) Foreign Application Priority Data

Apr. 24, 1998 (EP) ........................................... 98107471

(51) Int. Cl.[7] ............................................... H04B 7/005

(52) U.S. Cl. ....................................... 455/502; 375/356

(58) Field of Search ................................ 455/502, 517; 375/356, 354; 370/503

(56) References Cited

U.S. PATENT DOCUMENTS 5,128,925 A * 7/1992 Dornstetter et al. ........ 455/502
5,608,765 A * 3/1997 Tanoue ....................... 455/502
5,729,543 A 3/1998 Weigand et al. ............ 370/347

FOREIGN PATENT DOCUMENTS

EP 0 401 763 12/1990 ............. G06F/1/04
GB 2297458 A 7/1996 ............ H04Q/7/38
WO WO97/16893 5/1997 ............ H04B/7/26

* cited by examiner

*Primary Examiner*—Nguyen Vo

(57) ABSTRACT

A mobile radio (10) with a synchronization apparatus (14) executes a method (60) for time synchronizing the radio (10) and a base station (12). Base station (12) and radio (10) have internal timers (26, 16). A control unit (18) in the radio (10) receives a signal (29) from the base station (12) and determines the difference F between timers (26, 16, 30) in the base (12) and mobile (10). The control unit (18) writes instructions I(i) and their execution times T(i) to a memory (42) within the radio (10). One of these instructions I(N) reloads the radio timing counter (30) with a corrected value C=f(F,B) at a predetermined time T(N)=B which avoids conflicts with other operations of the radio (10).

12 Claims, 4 Drawing Sheets

RADIO WITH SYNCHRONIZATION APPARATUS AND METHOD THEREFORE

FIELD OF THE INVENTION

The invention concerns a mobile radio with a time synchronization apparatus and a method for performing time synchronization between a base station and the mobile radio.

BACKGROUND OF THE INVENTION

In cellular communication, mobile radios (i.e.-"radio") and radio base stations (i.e.-"base") exchange data and control signals. The base can serve more than one radio, and several bases can serve a plurality of radios in a defined geographic area. A single radio generally communicates with one base at a time. The radio and base should be time synchronized in order for the transmitted and received signals to be properly interpreted by the radio and the base.

In both radio and base there are timing units for timing events executed within the radio and the base. Such timing units can include one or more counters. The counters are used to time various events occurring within the radio and base and for measuring time intervals. For example, one counter can count the number of communication frames being exchanged between base and radio, and another counter can be used to trigger events that occur within a communication frame. In order for the radio and base to function properly, the timing counters in the radio and the base should be periodically synchronized.

Offset between the timing counters of the radio and base can occur, for example, as a result of a handover of a radio between two base stations or from movement of the radio which changes the propagation time of the signals exchanged between the base and radio. In order to synchronize the timing counter of the mobile radio and the timing counter of base station, timing signals are periodically sent by one to the other and an offset is calculated and one or both timing counters adjusted. Usually the timing counter in the mobile radio is adjusted.

Prior art arrangements for synchronizing a mobile radio timing counter have several disadvantages. Resetting the timing counter can interfere with normal operation of the radio, especially when the timing reset occurs while the timing unit is in the middle of scheduling or triggering some operation within the radio.

Another problem of the prior art is that there is often a lack of synchronization between a microprocessor controlling the radio and the timing unit. If the microprocessor initiates a timer update procedure just as the timing counter is rolling over to begin a new count, an entire count period can be missed.

A further problem in the prior art is the need to compensate for the time lapse between reading the timing counter value and writing an updated value to the timing counter. This time lapse can vary, e.g., due to microprocessor interrupts, thereby causing the synchronization to be inaccurate.

Accordingly, there is an ongoing need for an improved apparatus and method for synchronizing timing in separated radios.

DETAILED DESCRIPTION OF THE DRAWINGS

As used herein, the words 'radio' or 'radio device' or 'radio signals' and the like are not intended to be limited to a particular frequency of operation or to signals propagated merely through the air, but to include communication apparatus of any kind exchanging timing information through any propagation media, gas, liquid, solid or space, and at any propagation frequency.

An advantage of the present invention is that it provides a radio with accurate synchronization while minimizing or avoiding conflicts with other timed operations of the radio.

Figure 1:
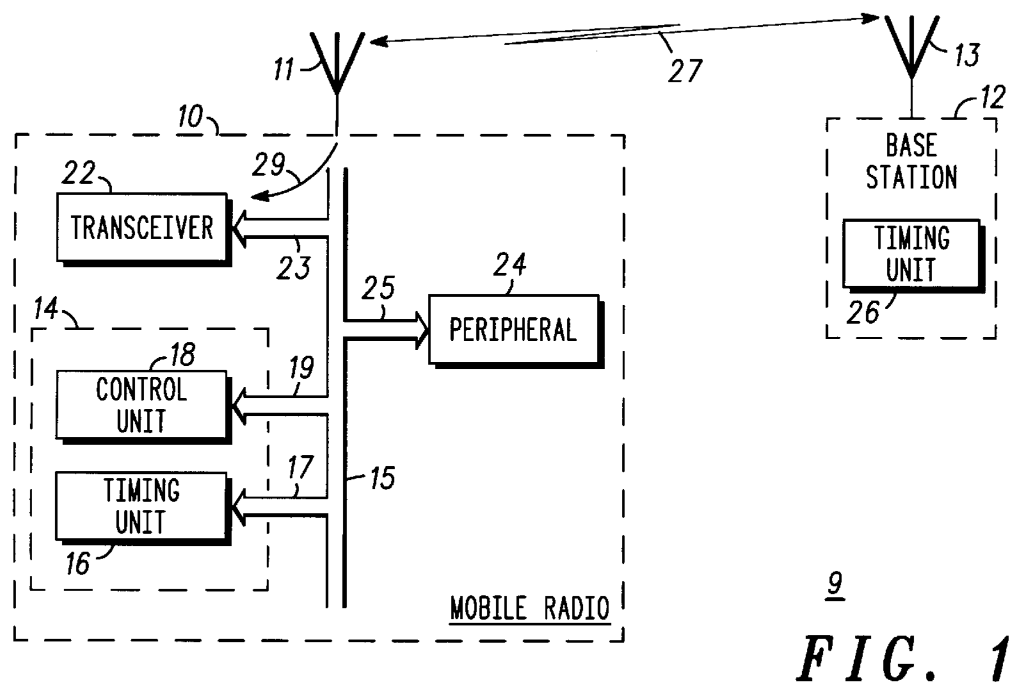
FIG. 1 is a simplified schematic diagram of a radio system having a synchronization apparatus, according a preferred embodiment of the present invention.

FIG. 1 is a simplified schematic diagram of radio system 9 having mobile radio 10 which operates in radio communication with base station 12. Radio 10 has synchronization apparatus 14, according a preferred embodiment of the invention. Synchronization apparatus 14 includes timing unit 16 and control unit 18. Radio 10 also has transceiver 22, optional peripheral 24, and antenna 11. Control unit 18 is conveniently a processor which controls the operation of radio 10 as a whole. Transceiver 22 and antenna 11 are conventional. Timing unit 16, control unit 18, transceiver 22 and peripheral 24 are conveniently coupled by bus 15 through bus connections 17, 19, 23 and 25 respectively, although other means well known in the art for coupling such elements can also be used. Base station 12 has timing unit 26 and antenna 13 and other conventional elements not depicted but well known in the art.

For purposes of explanation, it is assumed that base station 12 sends timing synchronization signal 27 to mobile unit 10, but this is not essential and a synchronization signal can be sent the other way. Synchronization signal 27 is coupled within mobile unit 10 as indicated by arrow 29 to transceiver 22 and thence by bus 15 to control unit 18 and timing unit 16. Control unit 18 and timing unit 16 cooperate as is more fully explained in connection with the figures that follow to correct any discrepancies between timing units 26 and 16 as communicated by signals 27, 29 without interfering with other operations of the radio.

Although the present invention is illustrated for the situation where mobile radio 10 is exchanging information with base station 12, persons of skill in the art will understand that base station 12 can also be another mobile unit and that radio 10 can also be another base station, that is, elements 10 and 12 can be any kind of radios between which synchronization of event counters or internal clocks or both need to be maintained. As used herein the words "mobile radio", "radio" and "base station" are intended to include such variations.

Figure 2:
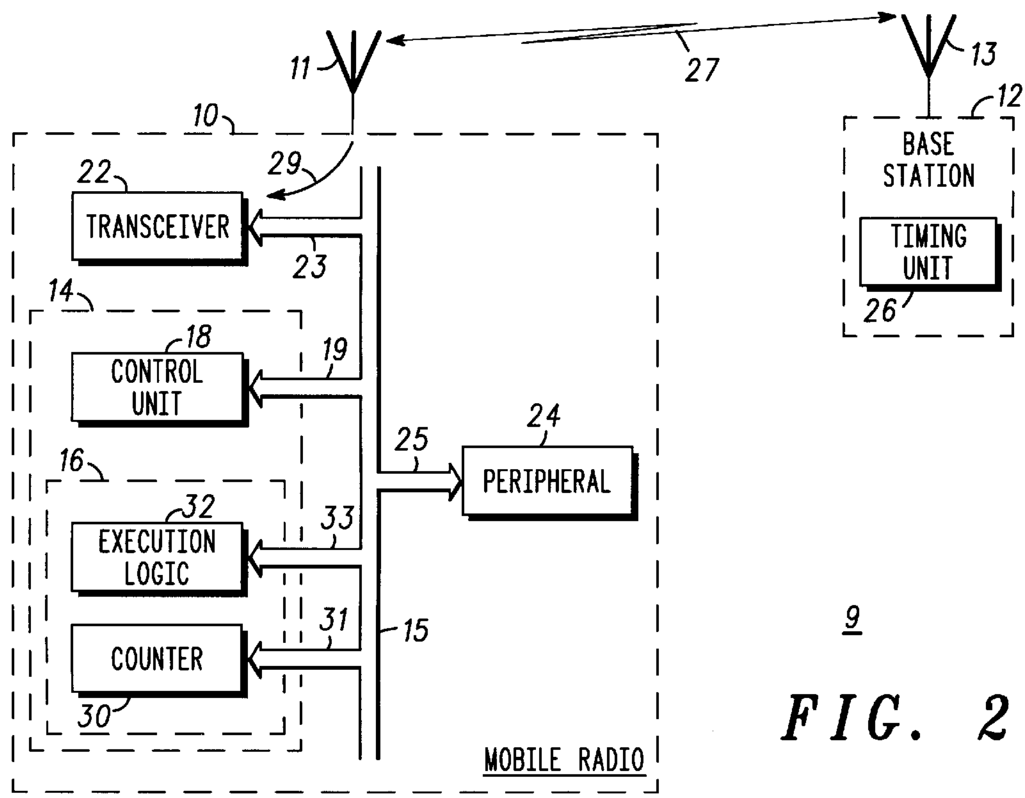
FIG. 2 is a simplified schematic diagram of the radio system of FIG. 1 showing further details of the synchronization apparatus according to a first embodiment.

FIG. 2 is a simplified schematic diagram of the radio of FIG. 1 showing further details of synchronization apparatus 14 according to a first embodiment. The same reference numbers are used to identify like elements in the figures. In FIG. 2, timing unit 16 is illustrated as comprising counter 30 coupled to bus 15 by bus connection 31 and execution logic 32 coupled to bus 15 by bus connection 33. The cooperation of these elements is more fully explained in connection with FIGS. 4–6.

Figure 3:
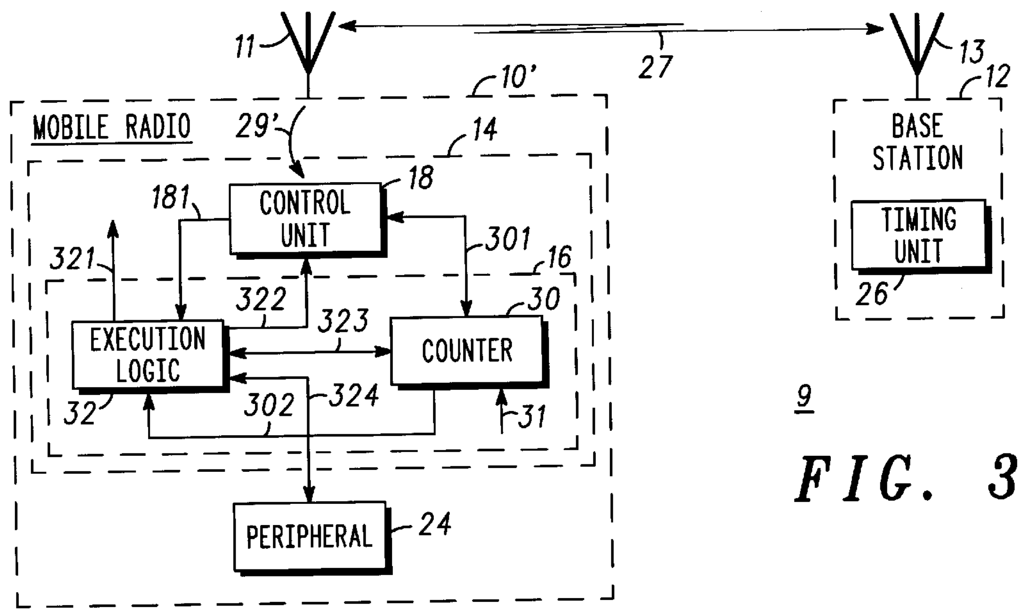
FIG. 3 is a simplified schematic diagram of the synchronization apparatus of FIG. 2 showing further detail according to a second embodiment.

FIG. 3 is a simplified schematic diagram of radio system 9 with radio 10' analogous to radio 10 of FIG. 2, and having synchronization apparatus 14 shown in further detail according to a second embodiment. For convenience of explanation, transceiver 22 is omitted from radio portion 10' of FIG. 3. For convenience of explanation, reference to radio "10" is intended to include radio "10'" and vice versa.

FIG. 3 illustrates the arrangement wherein counter 30, execution logic 32 control unit 18 and peripheral 24 are coupled independently of bus 15. Either arrangement is useful. In FIG. 3, control unit 18 receives timing synchronization signal 29' analogous to signal 29 of FIGS. 1–2. Control unit 18 has output 181 coupled to execution logic 32. Execution logic 32 has output 321 analogous to bus connection 33 for coupling to other portions of radio 10 not shown in FIG. 3. Execution logic 32 has output 322 coupled to control unit 18 and output 323 coupled to counter 30. Counter 30 has output 301 coupled to control unit 18 and output 302 coupled to execution logic 32. Connection 324 analogous to bus connection 25 couples peripheral 24 to and from execution logic 32. Counter 30 receives clock input 31 derived from a system master clock (not shown). Clock input 31 conveniently causes counter 30 to increment (or decrement) by one count for each clock input signal.

While radio 10 is illustrated herein as having only one timing unit 16 and one counter 30, persons of skill in the art will understand that radio 10 can have multiple timing units 16 or multiple counters 30 or both which can be synchronized with related timing units and counters in base station 12, and that the illustration of only one timing unit and one counter in radio 10 is merely for convenience of explanation.

Control unit 18 loads a sequence of instructions into execution logic 32 that it is desired that radio 10 execute, for example, during a communication signal frame. Execution logic 32 contains a memory store for receiving these instructions. Associated with each instruction is a time value (e.g., counter count) when the particular instruction is to be executed, e.g., within a communication frame. However, such instructions are not limited to use within an individual frame. The execution logic sequentially executes each instruction at the time associated with each instruction, time being conveniently measured by counter 30.

After radio 10 receives time synchronization signal 27, 29' derived from base station 12, control unit 18 causes a 'RELOAD COUNTER' instruction and execution time to be stored in execution logic 32, for example, along with the other instructions for the relevant communication frame.

Synchronization signal 27 can take several forms. For example, base 12 can send a 'time' value, as for example, a count or other timing signal being generated by timing unit 26. This is convenient when base 12 does not have current knowledge of the time state of radio timing unit 16. Alternatively, base unit 12 can send a time offset, as for example, the time shift which will occur when radio 10 is handed off from one base 12 to another base in an adjoining cell of a cellular radio system. Radio 10 is able to distinguish whether a time or offset value has been transmitted by base 12.

When base 12 sends a time value, synchronization apparatus logic 14 measures the difference between the time value of timing unit 26 in base 12 and the time value of timing unit 16 in radio 10 to find the offset, i.e., the difference in time values. When base 12 sends an offset or a quantity proportional to the offset, then this is recognized.

In either case, control unit 18 determines the count correction necessary to be loaded into counter 30 upon execution of the 'RELOAD COUNTER' instruction to take into account the time value or offset communicated by signal 27, 29, 29' and the 'RELOAD COUNTER' instruction execution delay time.

The execution logic executes the stored instructions in sequence, each instruction being executed at the associated execution time stored with the instruction. When the 'RELOAD COUNTER' instruction is reached, the execution logic causes an updated count value (offset F+instruction execute delay value B) to be loaded into counter 30, thereby synchronizing counter 30 and counter 26. The cooperation of the elements in FIG. 3 is explained more fully in connection with FIGS. 4–6. Execution logic 32 then executes any remaining instructions at the associated execution times determined by the corrected (i.e., 'reset') count from counter 30.

Figure 4:
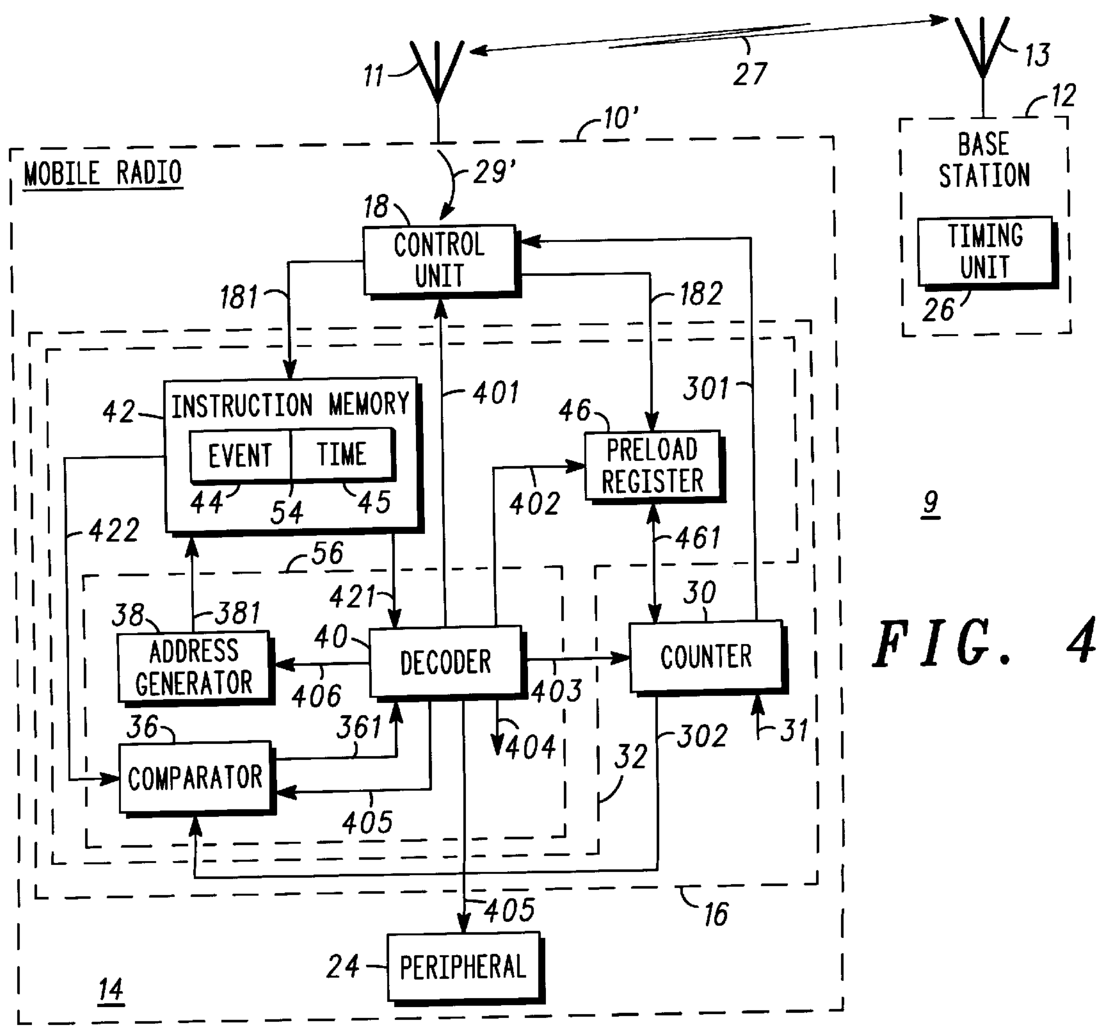
FIG. 4 is a simplified schematic diagram of the synchronization apparatus of FIG. 3 showing still further detail.

FIG. 4 is a simplified schematic diagram of apparatus 14 of radio 10 comprising timing unit 16 and execution logic 32 of radio portion 10' of FIG. 3 showing still further detail. The same reference numbers are used to identify the same elements in the figures.

Execution logic 32 comprises comparator 36, address generator 38, decoder 40, instruction memory 42 and preload register 46. Peripheral 24 and counter 30 are also shown. Instruction memory 42 has instructions I(i) stored therein in locations 54(i) (see FIG. 5). Each instruction I(i) comprises EVENT operand O(i) stored in memory portion 44 and execute TIME T(i) stored in memory portion 45. TIME T(i) specifies the execution time (e.g., in counts of counter 30) of operand O(i). When memory 42 is addressed, both the EVENT operand and its execution TIME are stored or retrieved, as the case may be. Control unit 18 provides output 181 to memory 42 to load instructions I(i).

Execution logic 32 operates under the control of control unit 18 which supplies EVENT and TIME instructions to memory 42, and receives feedback on what instructions have been decoded by decoder 40 via line 401. Memory 42 provides output 421 to decoder 40 and output 422 to comparator 36. Memory 42 also receives output 381 from address generator 38. While memory 42 is depicted here as being a single memory with EVENT and TIME portions 44, 45, this is merely for convenience of explanation and, as those of skill in the art will understand based on the teachings herein, that multiple memories can also be used.

Decoder 40 receives signals from memory 42 on line 421 and from comparator 36 on line 361 and provides output 401 to control unit 18. Decoder 40 conveniently provides output 402 to preload register 46 or output 403 to counter 30 or both, output 404 to the remainder of radio 10 (not shown in FIG. 4), and output 405 to comparator 36 and output 406 to address generator 38. As is more fully explained in connection with FIGS. 5–6, decoder 40 interprets instructions delivered from memory 42 and issues commands to elements 18, 24, 30, 36, 38, 46 according to the nature of each instruction.

Address generator 38 receives, for example, an 'end-of-instruction' messages from decoder 40 and generates a command on output 381 to load the next instruction from memory 42 into decoder 40 and comparator 36, depending on the instruction. Also, depending on the instruction operand, decoder 40 can issue an instruction or trigger signal to peripheral 24 on line 405 or to another portion (not shown) of radio 10 on output 404. Peripheral 24 is intended to represent any other portion of radio 10. Line 404 can also couple to transceiver 22.

Counter 30 receives timing clock signals on input 31 and provides event timing counts on line 302 to comparator 36. When comparator 36 determines that the timing count received from counter 30 matches the execution TIME count T(i) loaded into comparator 36 from TIME portion 45 of instruction memory 42 in response to an address generated by address generator 38, then comparator 36 tells decoder 40 to execute the instruction operand associated with the given TIME value.

For example, for a synchronization operation, a count correction value C derived or obtained from correction signal 29' by control unit 18, is downloaded from control unit 18 via 182 into preload register 46. Operand O(N) for 'RELOAD COUNTER' is read from memory portion 54(N) with its execution time T(N) which is loaded into comparator 36. When comparator 36 determines that the time T(N) has arrived to execute 'RELOAD COUNTER' instruction O(N), decoder 40 issues a command on output 402 to register 46 to send C to counter 30 on 461 or issues a command on output 403 to have counter 30 fetch C from register 46 via 461, thereby causing C to be loaded into counter 30 correcting the timing count to correspond to the timing count of timing unit 26 or other synchronization need.

Figure 5:
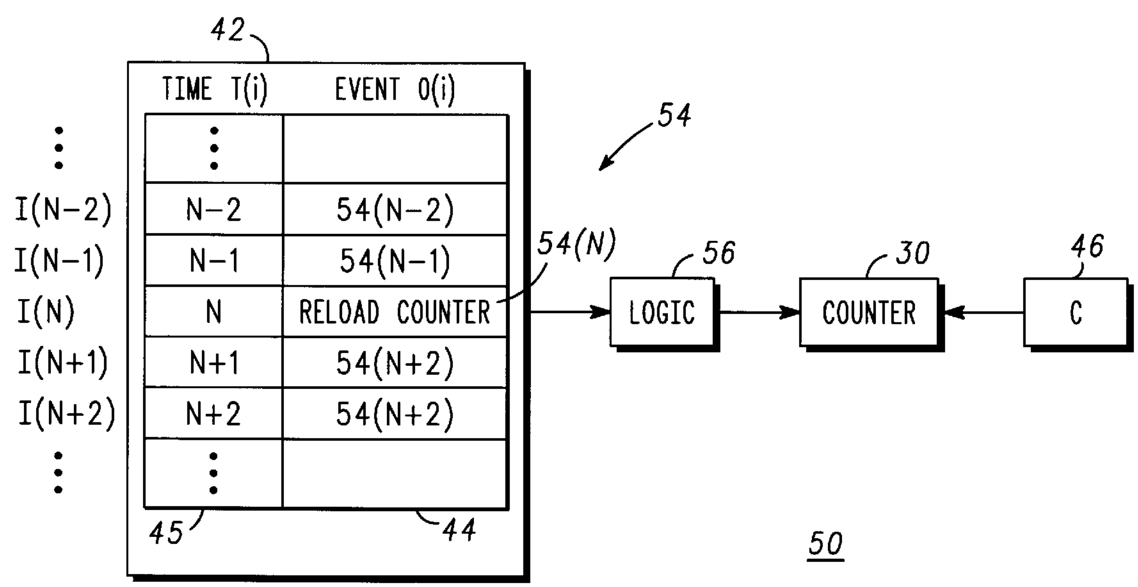
FIG. 5 is simplified schematic diagram showing pictorially how a RELOAD COUNTER command is provided to update the timing counter.

FIG. 5 shows simplified schematic diagram 50 representing pictorially how a counter-reload command is provided to update timing counter 30. Stored in locations 54(i) in memory 42 are instructions I(i) comprising EVENT operands 0(i) and associated TIME values T(i), where i=0 to M>/=N, i being an integer and M being the last instruction to be executed by radio 10, e.g., during a particular communication frame. The instruction 'RELOAD COUNTER' is depicted as being loaded into memory location 54(N). Other instructions I(i) loaded into locations 54(i)=54 (0) . . . 54(N−1), 54(N−2) . . . 54(N+1), 54(N+2) . . . M are also symbolically depicted. The exact nature of these other instructions is not important to the present invention.

Associated with each EVENT operand O(i) in memory location 54(i) is a time value T(i) for i=0 . . . N−2, N−1, N, N+1, N+2, etc. N can have any value and it is not necessary that there be instructions with values i>N. The time values T(i) are the times, conveniently measured by counter 30, at which the corresponding operand O(i) of each instruction I(i) is to be executed. Instructions I(i) are loaded into memory 42 by control unit 18 according to the needs of the user of the radio to control its operation. When memory 42 is accessed, instruction I(i) comprising operand O(i) and corresponding execution time value T(i) at memory address 54(i) are delivered to logic 56.

Logic 56 is shown by way of example in FIG. 4, but those of skill in the art will understand that the functions performed by logic 56 and described herein can be performed by the elements shown in any of FIGS. 1–4. When logic 56 receives instruction I(N)=do EVENT [defined by O(N)] at TIME [defined by T(N)]="RELOAD COUNTER" at time T(N), it causes counter 30 to fetch corrected count "C" from register 46 or, alternatively, register 46 is commanded to down load corrected count C into counter 30. Either arrangement is useful. When count correction value C is loaded into counter 30, then counter 30 and timing unit 26 (or any other desired timing unit) are in synchronism. The manner in which C is determined is explained more fully in connection with FIG. 6.

Figure 6:
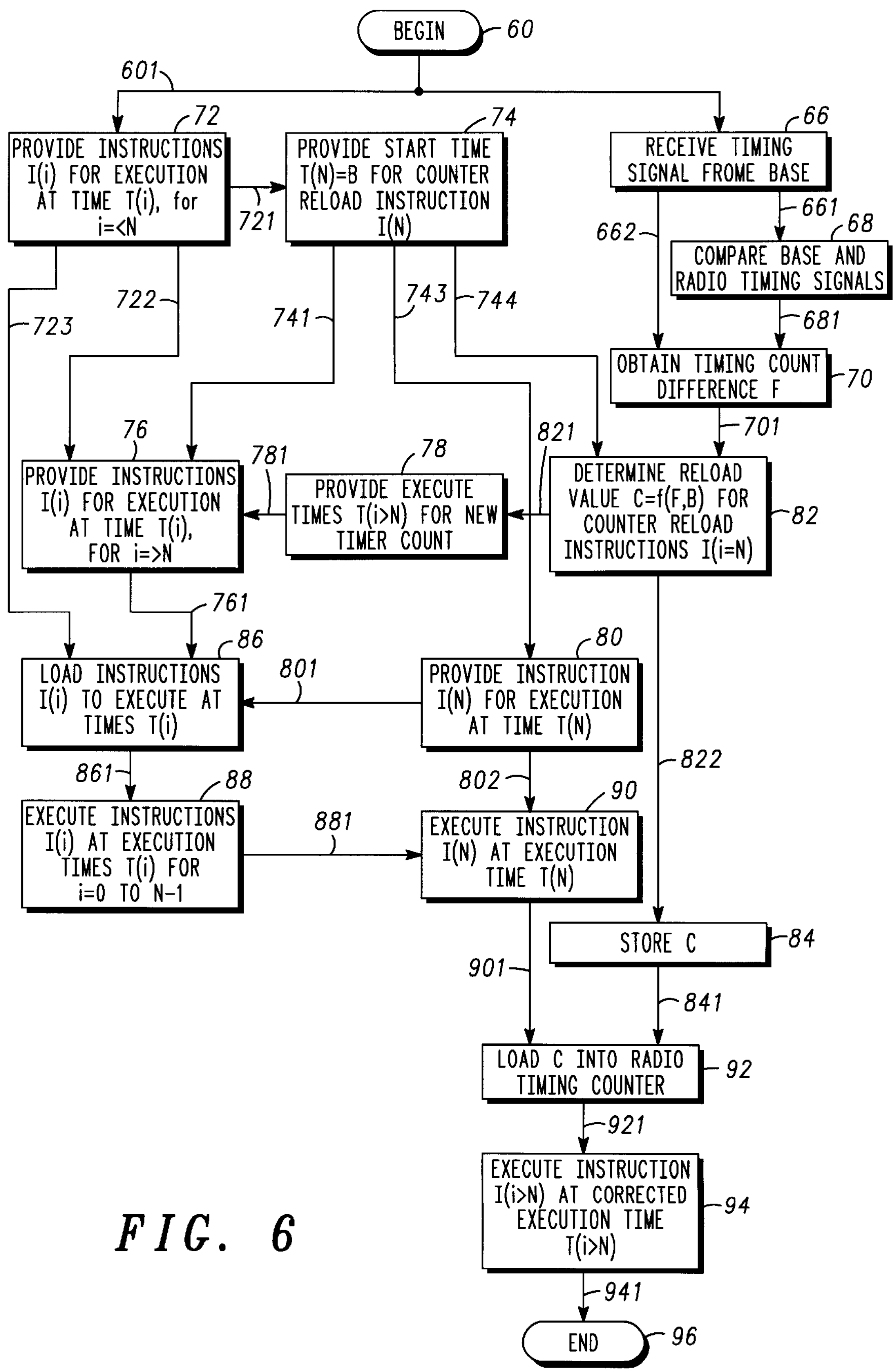
FIG. 6 is a flow diagram of a method for synchronizing the radio, according to a preferred embodiment of the present invention.

FIG. 6 is a flow diagram of method 60 for synchronizing radio 10, according to a preferred embodiment of the present invention. Timing correction signal 27, 29, 29' is received in step 66. When timing correction signal 27, 29, 29' contains a time value (e.g., the count value of a counter in timing unit 26 of base 12), then this time value is compared in step 68 to a corresponding time value in radio 10 (e.g., the current count of counter 30) and the timing count difference F obtained in step 70, as indicated by paths 661, 681.

Alternatively, if timing correction signal 27, 29, 29' is an offset value, (e.g., proportional to a count difference by which counter 30 should be shifted to compensate for radio 10 crossing a cell boundary), then this offset is passed to step 70 to determine the value of F without the need for step 68, as indicated by path 662. While it is convenient to compare the state of counters in timing units 26, 16, any method of determining the timing difference between radio 10 and base 12 (or any other unit desired to be time synchronized) can be used and the described method is intended to include such variations in determining F.

As indicated by path 601, in step 72 instructions I(i) for i<N for operation of radio 10 are provided. Some of steps 72–80 can proceed independently in time with respect to steps 66–70 and occur before, during or after steps 66–70.

In Step 72, instructions I(i) for i<N are provided. These instructions, for example, cause various radio operations to occur within a given communication frame and are conveniently determined by the radio programmer and may or may not be influenced by the radio user. Instructions I(i) for i<N occur prior to instruction I(N). In this example, instruction I(N) has operand O(N)='RELOAD COUNTER'. Step 72 is conveniently coupled to steps 74, 76 and 86 as indicated by paths 721, 722, 723.

In step 74 the start time T(N)=B of instruction I(N) is determined. T(N) depends on the start time T(N−1) of instruction I(N−1) plus whatever execution time is associated with instruction I(N−1). If instructions I(i) for i<N each take only one clock cycle (e.g., of counter 30) to execute, and the instructions are executed sequentially without intermediate delay, then T(N)=N, where N is, for example, related to the number of counts of counter 30 that have occurred since radio 10 commenced executing instruction sequence I(i) (e.g., at the beginning of a frame). While it is assumed for convenience of explanation that instructions I(i) are each executed during a single clock cycle and are all executed during a single communication frame, this is not required. Also, some or all of instructions I(i) can be repeated in subsequent communication frames. The result of step 74 is conveniently communicated to steps 76, 80, 82 as indicated by paths 741–744, but is not essential for all such steps, the different paths indicating various ways in which execution times T(i>N) for instructions I(i>N) can be determined. Those of skill in the art will understand based on the description herein how various alternatives can be employed depending upon the details of the system they are designing or operating.

Steps 72 and 74 are coupled to step 76 as indicated by paths 722 and 741. In the case of step 72, this indicates that further instructions I(i) can be provided and in the case of step 74, this indicates what start time T(N) for I(N) has been determined. In step 76, instructions I(i) for i>N are provided to control operation of radio 10 after 'RELOAD COUNTER' instruction I(N) is completed.

Step 74 is coupled to steps 80, 82 as indicated by paths 743, 744. In step 82, counter reload value C=f (F, B) is determined based on the outputs of steps 70 and 74 as indicated by paths 701 and 744. In a convenient embodiment where F is a count offset value at the beginning of a communication frame and B is a count delay value corresponding to the time of execution T(N) of instruction I(N) within the communication frame, then C is a count value (e.g., F+B) to be loaded into counter 30 upon execution of instruction I(N) at T(N) to synchronize timing units 26 and 16. It will be understood by those of skill in the art that the relation C=f(F,B)=F+B is intended to be functional and not merely algebraic and that, depending upon the nature of counter 30 and the corresponding counter in timing unit 26, the values of F and B are combined by addition or subtraction or otherwise, to provide a new count value C to be loaded into counter 30 at time T(N).

In many radios, signal 27 is transmitted (and signals 29, 29' derived therefrom) at the beginning of a communication frame from which times T(i) are also measured. Thus, determining the value of C is straightforward and obtained by adding or subtracting F and B depending upon whether the counter being corrected is a count-up or count-down counter. Persons of skill in the art will understand based on the description herein how to evaluate C=f(F,B) for the particular communication system and protocol they are using. Counter reload value C is stored in preload register 46 (see FIGS. 4–5) in step 84 as indicated by path 822.

Counter reload value C (or a value related to C) is optionally communicated, as indicated by path 821 to step 78 so that the corrected values of T(i) for i>N can be provided in instructions I(i>N), which are in turn communicated to step 76 as indicated by path 781. In step 76, instructions I(i) for i>N are provided and, as indicated by path 761 communicated to load instructions step 86.

In step 86, instructions I(i) are loaded (e.g., into memory 42) and, as indicated by path 861, are executed in step 88 for i<N by logic 14, 16, 32 as described in connection with FIGS. 1–5. Steps 88 and 90 are coupled as indicated by path 881. In step 90, instructions I(N) is executed, i.e., 'RELOAD COUNTER', and as indicated by path 901 leading to step 92 and path 841 between step 84 and 92, this causes logic 14, 56 to fetch C from preload register 46 and load C into radio timing counter 30. It does not matter whether step 92 is performed by a download command directed to register 46 to download C into counter 30 or by a fetch command in which counter 30 fetches C from register 46 or in some other way. Any convenient arrangement can be used.

When 'load C' step 92 is complete, then as indicated by path 921, any remaining instructions I(i) for i>N are executed in step 94 at times T(i) for i>N, wherein the corrected values of the execution time T(i>N) take into account the changed vales of the count provided by counter 30 after the 'RELOAD COUNTER' command has been executed. Following execution of the last instruction I(M), then as indicated by path 941 and 'END' 96, the process terminates until a subsequent frame or other event occurs thereby causing process 60 to repeat with the same or different instructions I(i).

In general, T(i) corresponding to instructions I(i) can be predetermined, including T(N) for instruction I(N). For example, T(N) can be selected by the radio programmer at the time that instruction sequence I(i) is provided for controlling the operation of the radio and performing a synchronization operation at such time T(N)=B so as to not interfere with other operations of the radio according to instructions I(i<N) and I(i>N) at times T(i<N) and T(i>N). This is a particular feature of the present invention and insures that the 'RELOAD COUNTER' operation does not interfere with any other radio operation. This avoids one of the significant deficiencies of the prior art.

In the prior art it is often not known for certain what operations the radio may be performing when a synchronization operation is desired. Thus, extra, unusable time called a guardband is often set aside during synchronization to avoid collisions with other functions of the radio. An advantage of the present invention is that such time guardbands for need not be provided. This is because with the present invention, the time at which synchronization occurs can be predetermined by programming of the instructions into memory 42, including the 'RELOAD COUNTER' instruction, so that there are no competing instructions being concurrently executed. Thus, the synchronization conflict problem is avoided. This is a significant advantage of the present invention.

While in a preferred embodiment of the present invention, the sequence of instructions is predetermined and need not change during a communication frame, this is not essential. The present invention permits variable timing of instruction I(N) for the 'RELOAD COUNTER' operation provided that the start time and the execution time of the preceding instruction I(i=N−1) can be determined. When variable timing is needed, this is accomplished by having step 74 occur after some or all of instructions I(i) for i<N have executed so that T(N−1) and the time required to execute T(N−1) become known or predictable. Thus, the present invention is not limited to static systems whereby the instruction queue I(i) and its executions times (T(i) are fully known apriori.

It will be understood by those skilled in the art that various changes in form and detail can be made without departing from the spirit and scope of the invention which is determined by the claims that follow. While the present invnetion has been describe by way of example for use in conjunction with a radio, persons of skill in the art will understand that it is broadly applicable to different types of electronic apparatus and it is intended to interpret "radio" to include such in the claims that follow.

What is claimed is:

1. A radio having time synchronization, the radio comprising:

a receptor for receiving a timing signal from another radio;

a timing unit providing a timing signal within the radio;

a control unit coupled to the timing unit and the receptor, wherein the control unit provides a timing offset value F based on the timing signal from the another radio;

a memory coupled to the control unit for receiving a series of instructions I(i) from the control unit, the instructions I(i) comprising operand instructions O(i) for controlling operations of the radio and time of execution instructions T(i) specifying when each O(i) is to be executed, where i is an index having values 0, . . . , N, . . . , M;

wherein, the control unit determines a timing unit correction value C=f(B,F) where B is a completion time of instruction I(N−1), F is the timing offset value and C is a value necessary to bring the timing unit into predetermined relationship with a timing unit of the another radio, and wherein the control unit includes in the instructions I(i) an instruction I(N) embodying an operand O(N) for execution at time T(N), the operand O(N) causing the correction value C to be loaded into the timing unit.

2. The radio of claim 1 wherein the index i is determined by timing signals from the timing unit.

3. The radio of claim 1 wherein the correction value C is placed in a register pending execution of some or all of instructions I(i) for i<N and wherein instruction I(N) causes C to be transferred from the register to the timing unit upon execution of O(N) at time T(N).

4. The radio of claim 1 wherein values of execution times T(i) for i>N are adjusted to take into account a change in output of the timing unit after correction value C is loaded therein.

5. The radio of claim 1 wherein the control unit determines the execution times T(i) for i>N prior to loading I(i) into the memory.

6. The radio of claim 1 wherein the control unit adjusts the execution times T(i) for i>N after loading some or all of I(i<N) into the memory.

7. The radio of claim 1 wherein the control unit compares the timing signal received form the another radio with a timing signal from the timing unit to determine F.

8. The radio of claims 1 wherein the control unit detects whether the timing signal from the another radio is a time offset signal or a time signal.

9. A method for operating a radio having instruction execution logic and a radio timing unit to synchronize the radio timing unit with another radio timing unit, comprising the steps of:

receiving another radio timing value from the another radio timing unit;

determining from the another radio timing value a timing difference value F;

providing instructions I(i) to be executed by the radio wherein each instruction I(i) comprises an operand O(i) and an execution time T(i) for the operand, where i is an index; then in either order, determining a time N for execution of an Nth instruction I(N) comprising an operand O(N) to be executed at time T(N)=B wherein B is greater than the time of completion of instruction I(N−1), and determining a timing unit correction value C=f(B,F); and operating the instruction execution logic to execute instructions I(i) at time T(i) so that at time T(N), operand O(N) of instruction I(N) causes the correction value C to be loaded into the radio timing unit.

10. The method of claim 9 wherein the index i advances with each output count from the radio timing unit.

11. The method of claim 9 wherein the operating step comprises placing the correction value C in a register pending execution of some or all of instructions I(i) for i<N and wherein instruction I(N) causes C to be transferred from the register to the timing unit upon execution of O(N) at time T(N).

12. The method of claim 9 wherein the index i is derived from an output count of the timing unit and wherein the method further comprises: providing instructions I(i) for i>N, and adjusting values of T(i) for i>N to take into account changes in the output count of the timing unit after loading the correction value C.

* * * * *